(12) United States Patent
Gao et al.

(10) Patent No.: US 9,596,614 B2
(45) Date of Patent: Mar. 14, 2017

(54) METHOD AND APPARATUS FOR TRANSMITTING ACKNOWLEDGEMENT FRAME IN WIRELESS LOCAL AREA NETWORK

(71) Applicant: Huawei Technologies Co., Ltd., Shenzhen, Guangdong (CN)

(72) Inventors: Lei Gao, Chengdu (CN); Linfeng Xia, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 95 days.

(21) Appl. No.: 14/263,266

(22) Filed: Apr. 28, 2014

(65) Prior Publication Data
US 2014/0233553 A1 Aug. 21, 2014

Related U.S. Application Data

(63) Continuation of application No. PCT/CN2012/082755, filed on Oct. 11, 2012.

(30) Foreign Application Priority Data

Oct. 31, 2011 (CN) .......................... 2011 1 0337667

(51) Int. Cl.
  *H04W 24/04* (2009.01)
  *H04L 1/16* (2006.01)
  (Continued)

(52) U.S. Cl.
  CPC ........... *H04W 24/04* (2013.01); *H04L 1/1607* (2013.01); *H04L 1/1671* (2013.01); *H04W 28/06* (2013.01); *H04W 84/12* (2013.01)

(58) Field of Classification Search
  CPC ... H04L 1/1607–1/1671; H04W 24/04; H04W 28/06; H04W 84/12
  See application file for complete search history.

(56) References Cited

U.S. PATENT DOCUMENTS

2006/0280134 A1   12/2006  Kwon et al.
2008/0049707 A1   2/2008   Kwon et al.
(Continued)

FOREIGN PATENT DOCUMENTS

CN   1989742 A      6/2007
CN   101594210 A    12/2009
(Continued)

OTHER PUBLICATIONS

Liu et al. "Short Ack," IEEE 802.11-12/0324-r2, Slides 1-15, Institute of Electrical and Electronics Engineers, New York, New York (Mar. 12, 2012).
(Continued)

*Primary Examiner* — Pao Sinkantarakorn
(74) *Attorney, Agent, or Firm* — Leydig, Voit & Mayer, Ltd.

(57) ABSTRACT

Embodiments of the present invention provide a method and an apparatus for transmitting an acknowledgement frame in a wireless local area network. The method includes: generating an acknowledgement frame for a send frame, where the acknowledgement frame includes a short acknowledgement frame, and the short acknowledgement frame includes an STF, an LTF, and a SIG; and sending the acknowledgement frame. In the embodiments of the present invention, the short acknowledgement frame may not include a data unit, so that a size of the acknowledgement frame is reduced and an overhead of the acknowledgement frame is cut down, thereby improving interaction efficiency of the acknowledgement frame.

16 Claims, 2 Drawing Sheets

---

Generate an acknowledgement frame for a send frame, where the acknowledgement frame includes a short acknowledgement frame and the short acknowledgement frame is formed by an STF, an LTF, and an SIG  — 101

Send the acknowledgement frame — 102

(51) Int. Cl.
  *H04W 28/06* (2009.01)
  *H04W 84/12* (2009.01)

(56) References Cited

U.S. PATENT DOCUMENTS

| | | |
|---|---|---|
| 2009/0319852 A1 | 12/2009 | Nabetani |
| 2010/0046437 A1 | 2/2010 | Nishibayashi et al. |
| 2011/0038332 A1* | 2/2011 | Liu ................. H04L 1/1685 370/329 |
| 2011/0093755 A1 | 4/2011 | Gao |
| 2012/0093085 A1 | 4/2012 | Kwon et al. |
| 2013/0148592 A1 | 6/2013 | Noh et al. |
| 2013/0235860 A1* | 9/2013 | Vermani ............ H04W 28/06 370/338 |

FOREIGN PATENT DOCUMENTS

| | | |
|---|---|---|
| CN | 102158331 A | 8/2011 |
| KR | 20060128607 A | 12/2006 |
| KR | 20110093725 A | 8/2011 |
| WO | WO 2006132506 A1 | 12/2006 |

OTHER PUBLICATIONS

"IEEE Standard for Information Technology—Telecommunications and information exchange between systems—Local and metropolitan area networks—Specific requirements, Part 11: Wireless LAN Medium Access Control (MAC) and Physical Layer (PHY) specifications, Amendment 8: Medium Access Control (MAC) Quality of Service Enhancements," IEEE Std. 802.11e-2005, pp. i-189, Institute of Electrical and Electronics Engineers, New York, New York (Nov. 11, 2005).

"Draft Standard for Information Technology—Telecommunications and information exchange between systems—Local and metropolitan area networks—Specific requirements, Part 11: Wireless LAN Medium Access Control (MAC) and Physical Layer (PHY) specifications, Amendment 5: Enhancements for Very High Throughput for Operation in Bands below 6 GHz," IEEE P802.11ac/D1.0, pp. i-242, Institute of Electrical and Electronics Engineers, New York, New York (May 2011).

"Proposed Specification Framework for TGah," IEEE P802.11 Wireless LANs, pp. 1-5, Institute of Electrical and Electronics Engineers, New York, New York (Aug. 2011).

* cited by examiner

METHOD AND APPARATUS FOR TRANSMITTING ACKNOWLEDGEMENT FRAME IN WIRELESS LOCAL AREA NETWORK

CROSS-REFERENCE TO RELATED APPLICATIONS

This application is a continuation of International Patent Application No. PCT/CN2012/082755, filed on Oct. 11, 2012, which claims priority to Chinese Patent Application No. 201110337667.7, filed on Oct. 31, 2011, both of which are hereby incorporated by reference in their entireties.

FIELD OF THE INVENTION

Embodiments of the present invention relate to the field of wireless communications, and in particular, to a method and an apparatus for transmitting an acknowledgement frame in a wireless local area network.

BACKGROUND OF THE INVENTION

A basic service set (BSS) is a basic component of a wireless local area network (WLAN). Stations (STA), which are located within a specific coverage area and have certain association, form a BSS. A most basic form of the association is that the stations directly communicate with each other in a self-organizing network, which is referred to as an independent basic service set (Independent BSS, IBSS).

In a more common situation, an STA associates with a central station, which is especially responsible for managing a BSS; the central station is referred to as an access point (AP). A BBS established around an AP is referred to as a BSS with infrastructure. BBSs with infrastructure may be connected to each other by APs thereof through a distributed system (DS), so as to form an extended BBS (ESS).

Transmission on a wireless medium is prone to errors. For example, for data (DATA) transmission, a low delay retransmission mechanism at a link level is beneficial. This mechanism allows those frames, which are not correctly demodulated by a receiver, to be retransmitted. A basic method for implementing this point is to enable a station correctly receiving a data frame to send a timely acknowledgement in a format of an acknowledgement frame (ACK, Acknowledgement). If a station sending the data frame does not receive the ACK frame, the station sending the data frame assumes that the data frame is not correctly received and may retransmit the frame. For interaction between frames of other types, for example, for a Confirm To send (CTS) frame of a Request To Send (RTS,) frame, the mechanism of the acknowledgement frame may also be adopted similarly.

In an 802.11 network, data (DATA) includes a quality of service (QoS) control field, and this field includes an acknowledgement policy field. Currently, there are several acknowledgement policies as follows:

policy 1: normal acknowledgement or implicit block acknowledgement;

policy 2: non-acknowledgement;

policy 3: non-explicit acknowledgement or scheduled acknowledgement under PSMP (power save multi-poll); and policy 4: block acknowledgement.

In the first acknowledgement policy (the policy 1), for QoS data in a non-aggregated packet, a receiving end is specified to return an ACK frame. The ACK frame needs to be returned immediately, and a time interval between the returning of the ACK frame and a time point at which a sending end finishes dispatching data last data is a short inter-frame space (SIFS). An MAC (Media Access Control, media access control) layer portion of the ACK frame may also be referred to as a PLCP (Physical Layer Convergence Procedure) service data unit (PSDU, PLCP service data unit) or a data unit, and includes a frame control field, a duration field, a receiver address (RA) field, and a frame check sequence (FCS) used for demodulation and checking.

In a situation of a low rate, for example, a low-order modulation manner like BPSK (Binary Phase Shift Keying), or in a situation of a low coding rate, for example, ½ coding, an overhead taken for transmitting the MAC layer portion is large. Taking 802.11ac as an example, at a rate of 6 Mbps with a bandwidth of 20 M, each OFDM (Orthogonal Frequency Division Multiplexing) symbol may transmit three bytes. In this way, the MAC layer portion of the ACK has a total of fourteen bytes and needs to take five OFDM symbols. Besides, a preamble portion (preamble) of a physical layer has a total of six OFDM symbols. In this way, the overhead for the MAC layer portion amounts to 45% of a whole, which reduces the interaction efficiency of the acknowledgement frame.

SUMMARY OF THE INVENTION

Embodiments of the present invention provide a method and an apparatus for transmitting an acknowledgement frame in a wireless local area network, which can reduce an overhead for transmission of an acknowledgement frame.

In one aspect, a method for transmitting an acknowledgement frame in a wireless local area network is provided, which includes: generating an acknowledgement frame for a send frame, where the acknowledgement frame includes a short acknowledgement frame, and the short acknowledgement frame includes a short training field (STF), a long training field (LTF), and control signaling (SIG); and sending the acknowledgement frame.

In another aspect, a method for transmitting an acknowledgement frame in a wireless local area network is provided, which includes: sending a send frame to a receiving end; and receiving, from the receiving end, an acknowledgement frame for the send frame, where the acknowledgement frame includes a short acknowledgement frame, and the short acknowledgement frame includes a short training field (STF), a long training field (LTF), and control signaling (SIG).

In another aspect, an apparatus for transmitting an acknowledgement frame is provided, which includes: a generating unit, configured to generate an acknowledgement frame for a send frame, where the acknowledgement frame includes a short acknowledgement frame, and the short acknowledgement frame includes a short training field (STF), a long training field (LTF), and control signaling (SIG); and a sending unit, configured to send the acknowledgement frame generated by the generating unit.

In another aspect, an apparatus for transmitting an acknowledgement frame is provided, which includes: a sending unit, configured to send a send frame to a receiving end; and a receiving unit, configured to receive, from the receiving end, an acknowledgement frame for the send frame, where the acknowledgement frame includes a short acknowledgement frame, and the short acknowledgement frame includes a short training field (STF), a long training field (LTF), and control signaling (SIG).

In the embodiments of the present invention, the short acknowledgement frame may not include a data unit, so that a size of the acknowledgement frame is reduced and an overhead of the acknowledgement frame is cut down, thereby improving interaction efficiency of the acknowledgement frame.

BRIEF DESCRIPTION OF THE DRAWINGS

To illustrate the technical solutions in the embodiments of the present invention more clearly, the following briefly introduces the accompanying drawings needed for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF THE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
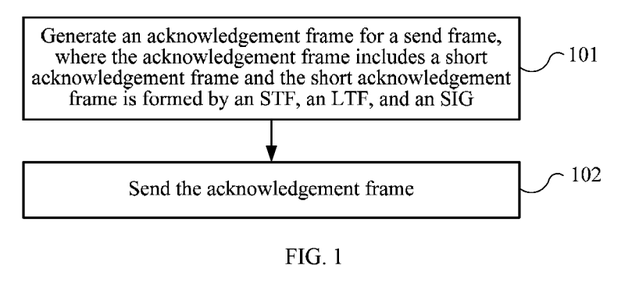
FIG. 1 is a method for transmitting an acknowledgement frame in a wireless local area network in an embodiment of the present invention.

FIG. 1 is a method for transmitting an acknowledgement frame in a wireless local area network in an embodiment of the present invention. The method in FIG. 1 is executed by a party sending an acknowledgement frame (for example, an STA or an AP).

101: Generate an acknowledgement frame for a send frame. The acknowledgement frame includes a short acknowledgement frame, and the short acknowledgement frame includes a short training field (STF), a long training field (LTF), and control signaling (SIG, signal).

For example, the STF may be a synchronization sequence, and the LTF may be a pilot frequency.

Optionally, as an embodiment, a SIG of the acknowledgement frame may include indication information, where the indication information is used for indicating whether the acknowledgement frame includes the short acknowledgement frame. For example, a reserved bit or a reserved status in the SIG may be used to carry the indication information, or a bit to which a new definition is added may be used to carry the indication information. Non-restrictive embodiments of the indication information are described in combination with specific examples in the following.

Optionally, as another embodiment, the indication information may also indicate other frame types, such as a normal acknowledgement frame or a normal data frame. For example, the acknowledgement frame may also include the normal acknowledgement frame. The normal acknowledgement frame includes an STF, an LTF, a SIG, and a PSDU and has a structure the same as that of an acknowledgement frame in the prior art. Therefore, the normal acknowledgement frame is not described here again. In addition, the normal data frame has a structure the same as that of a normal data frame in the prior art, and therefore is not described here again. It should be specially noted that STF, LTF, and SIG portions of the normal data frame are the same as those of the normal acknowledgement frame, and only a PSDU portion of the normal data frame is different from that of the normal acknowledgement frame.

Definitions of each field in the SIG of the short acknowledgement frame are the same as or different from those of the normal data frame (or the normal acknowledgement frame).

Optionally, as another example, the SIG of the short acknowledgement frame may include indication information used for indicating an RA or a partial RA of a receiving party. For example, the RA or the partial RA may be represented by a PAID (Partial Association Identifier) in the SIG. An example of the RA is an MAC address of the receiving party.

Alternatively, the SIG of the short acknowledgement frame may include indication information used for indicating a duration of the send frame or a duration of a transmit opportunity (TXOP, Transmit Opportunity). A duration (Duration) is generally used for setting a period of time of a TXOP and is generally set ready during first frame interaction. If an ACK frame does not appear during the first frame interaction, this field may not exist. Alternatively, as another embodiment, the duration may also be represented by a LENGTH (length) subfield in the SIG.

Optionally, as another embodiment, in step 101, the acknowledgement frame may be generated according to an indication of an acknowledgement policy field (for example, the policy 1 or an extended/modified version of the policy 1, or a newly added policy). Various policies in the embodiment of the present invention are described in combination with specific examples in the following.

Optionally, as another embodiment, when the acknowledgement policy field indicates normal acknowledgement or implicit block acknowledgement or truncated normal acknowledgement, a normal acknowledgement frame or a short acknowledgement frame is generated according to a modulation and coding scheme of the PSDU or the SIG.

Optionally, as another embodiment, when the acknowledgement policy field indicates normal acknowledgement or implicit block acknowledgement, a normal acknowledgement frame is generated.

Optionally, as another embodiment, when the acknowledgement policy field indicates truncated normal acknowledgement or when the acknowledgement policy field indicates truncated normal acknowledgement or implicit block acknowledgement, a short acknowledgement frame is generated.

Optionally, as another embodiment, when a version protocol corresponds to a carrier frequency higher than 1 GHz, it is determined that the acknowledgement policy field indicates the normal acknowledgement or the implicit block acknowledgement. When a version protocol corresponds to a carrier frequency lower than 1 GHz, it is determined that the acknowledgement policy field indicates the truncated normal acknowledgement or the implicit block acknowledgement.

Optionally, as another embodiment, the short acknowledgement frame and/or the normal acknowledgement frame may adopt a return interval shorter than an SIFS defined in current 802.11ac.

Optionally, as another embodiment, the send frame is a data (DATA) frame, and the acknowledgement frame is an ACK frame for the data frame. Alternatively, the send frame is a request to send RTS frame, and the acknowledgement frame is a confirm to send (CTS) frame for the RTS frame.

102: Send the acknowledgement frame.

For example, the acknowledgement frame generated in step 101 is returned to a sending end of the send frame.

In the embodiment of the present invention, the short acknowledgement frame may not include a data unit, so that a size of the acknowledgement frame is reduced and an overhead of the acknowledgement frame is cut down, thereby improving interaction efficiency of the acknowledgement frame.

Figure 2:
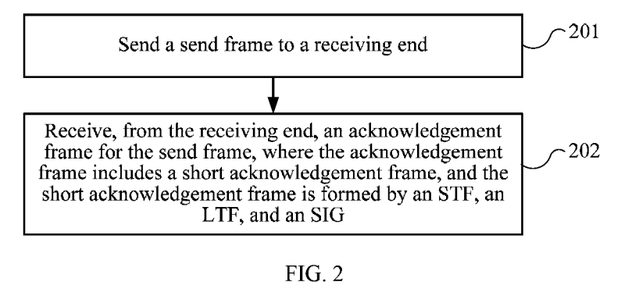
FIG. 2 is a method for transmitting an acknowledgement frame in a wireless local area network in another embodiment of the present invention.

FIG. 2 is a method for transmitting an acknowledgement frame in a wireless local area network in another embodiment of the present invention. The method in FIG. 2 is executed by a party receiving an acknowledgement frame (for example, an STA or an AP) and corresponds to the method in FIG. 1. Therefore, repeated description is appropriately omitted.

201: Send a send frame to a receiving end.

For example, the send frame may be a data frame or an RTS frame.

Optionally, as another embodiment, the send frame may carry an acknowledgement policy field, which, for example, indicates the policy 1 or an extended/modified version of the policy 1, or indicates a newly added policy. Various policies in the embodiment of the present invention are described in combination with specific examples in the following.

For example, the acknowledgement policy field may indicate normal acknowledgement or implicit block acknowledgement or truncated normal acknowledgement. Alternatively, the acknowledgement policy field may indicate normal acknowledgement or implicit block acknowledgement. Alternatively, the acknowledgement policy field may indicate truncated normal acknowledgement. Alternatively, the acknowledgement policy field may indicate truncated normal acknowledgement or implicit block acknowledgement.

Optionally, as another embodiment, when a version protocol corresponds to a carrier frequency higher than 1 GHz, the acknowledgement policy field indicates the normal acknowledgement or the implicit block acknowledgement. When the version protocol corresponds to a carrier frequency lower than 1 GHz, the acknowledgement policy field indicates the truncated normal acknowledgement or the implicit block acknowledgement.

202: Receive, from the receiving end, an acknowledgement frame for the send frame, where the acknowledgement frame includes a short acknowledgement frame, and the short acknowledgement frame includes an STF, an LTF, and a SIG.

Optionally, as an embodiment, in step 202, indication information included in the SIG of the acknowledgement frame may be obtained, and whether the acknowledgement frame includes the short acknowledgement frame is determined according to the indication information. For example, the indication information may be obtained, where the indication information is carried by a reserved bit or a reserved status or a bit to which a new definition is added in the SIG.

Optionally, as another embodiment, the indication information may also indicate other frame types, such as a normal acknowledgement frame or a normal data frame. For example, the acknowledgement frame may also include the normal acknowledgement frame. The normal acknowledgement frame includes an STF, an LTF, a SIG, and a PSDU and has a structure the same as that of an acknowledgement frame in the prior art. Therefore, the normal acknowledgement frame is not described here again. In addition, the normal data frame has a structure the same as that of a normal data frame in the prior art, and therefore is not described here again. It should be specially noted that STF, LTF, and SIG portions of the normal data frame are the same as those of the normal acknowledgement frame, and only a PSDU portion of the normal data frame is different from that of the normal acknowledgement frame.

Definitions of each field in the SIG of the short acknowledgement frame are the same as or different from those of the normal data frame (or the normal acknowledgement frame).

Optionally, as an embodiment, in step 202, a receiver address RA or a partial RA of a receiving party included in the SIG of the short acknowledgement frame may be obtained. For example, the RA or the partial RA may be represented through a PAID field in the SIG. An example of the RA is an MAC address of the receiving party.

Alternatively, a duration of the send frame or a duration of a transmit opportunity included in the SIG of the short acknowledgement frame may be obtained. For example, the duration may be represented through a LENGTH (length) field in the SIG.

Optionally, as another embodiment, a PAID included in the SIG may also be obtained, and in a situation in which the PAID is correct, a process of determining, according to the indication information, whether the acknowledgement frame is a short acknowledgement frame is executed.

Optionally, as another embodiment, when the send frame is a data frame, the acknowledgement frame may be an ACK frame for the data frame. Alternatively, when the send frame is an RTS frame, the acknowledgement frame may be a CTS frame for the RTS frame.

In the embodiment of the present invention, the short acknowledgement frame may not include a data unit, so that a size of the acknowledgement frame is reduced and an overhead of the acknowledgement frame is cut down, thereby improving interaction efficiency of the acknowledgement frame.

The acknowledgement policies in the embodiment of the present invention are described in detail in combination with specific examples in the following. It should be noted that these examples of acknowledgement policies are only provided for helping persons skilled in the prior art to clearly understand the concept of the present invention other than limiting the scope of the present invention.

Each specific embodiment as follows is mainly described by taking an example of a data frame (or referred to as data for short) and an ACK frame thereof (or referred to as an ACK for short, which includes a normal ACK or a short ACK), but the embodiments of the present invention are also similarly applicable to other types of acknowledgement frames.

For ease of description, an interaction scenario is assumed as a single interaction, which includes: sending and receiving data once and sending and receiving an ACK once. In this interaction, an STA1 is a TXOP holder and is a data sending end and a target receiving end of an ACK frame, an STA2 is a data receiving end and an ACK sending end, and an STA3 is another STA (the STA3 may include one or more STAs, which is not limited by the present invention). An important concept of a transmit opportunity (TXOP) is introduced in a modification of the 802.11e. A TXOP refers to a limited period of time in which a station may transmit a specific communication type. A station obtains a TXOP through competition. Once obtaining the TXOP, the station may transmit a data frame, a control frame, and a management frame and receive a response frame. A station that obtains a TXOP is referred to as a TXOP holder.

Embodiment 1

Operations on the data sending end (STA1) are similar to a data sending process in the prior art. It should be specially pointed out that, in this embodiment, an acknowledgement policy field (B5, B6) of a QoS control field of the data is filled with a policy 1 (B5B6=00), that is, normal acknowledgement or implicit block acknowledgement. To return a short ACK through the policy, a current protocol needs to be modified as follows:

Policy 1: normal acknowledgement, implicit block acknowledgement or truncated normal acknowledgement.

Operations on the data receiving end (STA2) are similar to a receiving process in the prior art. It should be specially noted that, in this embodiment, after the STA2 receives a data packet, the STA2 parses the acknowledgement policy field in the QoS control field to find that the acknowledgement policy is the policy 1 and the packet is a non-aggregated packet. Therefore, whether the normal ACK or the short ACK is to be used needs to be determined.

As an embodiment, whether the normal ACK or the short ACK is to be used may be determined according to a modulation and coding scheme of a PSDU or a SIG. For example, a format of the control signaling SIG is generally shown in Table 1.

TABLE 1

Control signaling

| Bit | Meaning |
|---|---|
| B0-B3 | MCS |
| B4-B15 | LENGTH, a length of the data (a unit thereof is byte) |
| B16-B24 | PAID, a partial association identifier of a receiving party |
| B25-B33 | Other fields |
| B34-B41 | CRC |
| B42-B47 | Tail (tail) |

As shown in Table 1, the control signaling generally includes the MCS (modulation and coding scheme, Modulation and Coding Scheme), so as to represent a modulation and coding scheme of the data. If a scheduled rate of the MCS is high, the normal ACK is selected and used. If the scheduled rate of the MCS is low, the short ACK is selected and used. Surely, other selection methods may also be adopted in an implementation process, which are not limited by the embodiment of the present invention.

When it is assumed that the short ACK is adopted, an operation on the ACK sending end (STA2) is as the following: Compared with the normal ACK, an MAC portion (or referred to as a PSDU) of the short ACK is removed, and a reserved status of a SIG portion of the short ACK is used for indicating that the packet is an short ACK. Specifically, as shown in Table 1, four bits from B0 to B3 form the MCS, and from zero to nine only ten kinds of MCS exist according to a current situation. Therefore, the reserved status exists, for example, 1111. Therefore, that the MCS is all 1 s (all the bits of the MCS are 1) may uniquely indicate that the packet is a short ACK, and when the MCS is 1110, it is indicated that the packet is a short CTS. At this time, a LENGTH subfield may not indicate a length of the data packet (using byte as a unit) according to an original definition and may indicate a Duration of this TXOP, which is similar to a function of a Duration field in an original MAC layer. Specifically, the LENGTH may indicate the number of OFDM symbols in this TXOP (each OFDM symbol with a normal guard interval has a duration of 40 μs), so that the LENGTH of 12 bits may indicate a Duration range of (0~212−1)*40 μs.

Compared with the normal ACK, a feedback interval of the short ACK is not changed, which is still an SIFS.

An operation on the target ACK receiving end (STA1) is as the following: because feedback time of the ACK is a fixed short time interval SIFS, the ACK receiving end may detect a channel in a period of time SIFS+Slot Time, so as to determine whether a packet is returned.

Once a returned packet is found, control signaling is first demodulated, and if a CRC (Cyclic Redundancy Check) is correct, it is considered that a control signaling portion is correctly received.

Next, it is determined whether a PAID is correct, that is, whether the PAID carried in the control signaling of the returned packet is consistent with a PAID of the ACK receiving end. If the PAIDs are consistent, it is determined that the PAID is correct, thereby determining that the returned packet is sent to the ACK receiving end. If the two PAIDs are inconsistent, it is determined that the PAID is incorrect, thereby determining that the returned packet is not sent to the ACK receiving end, and processing is not to be performed, for example, a process of determining, according to indication information, whether the returned packet is a normal ACK or a short ACK is not to be executed. In this way, the accuracy of returned packet detection can further be improved, thereby improving the efficiency of transmission of an acknowledgement frame.

As an embodiment, if the control signaling does not have the PAID, the step of determining whether the PAID is correct is skipped, for example, it may be considered that the returned packet is always sent to the ACK receiving end.

Next, it is determined whether B0 to B3 in the control signaling are all is (all the bit of the B0 to B3 is 1). If yes, the returned packet is considered as a short ACK. If not, the returned packet may be a normal ACK, and following data is demodulated according to a general data detection process. If the packet is a normal ACK and an FCS thereof is detected as correct, it is considered that a normal ACK is correctly received.

An operation on another ACK receiving end (STA3) is the same as that on the target ACK receiving end (STA1), but the step of determining whether the PAID is correct is absent. If the STA3 does not send a data packet before, the STA3 does not need to judge the PAID. After finding that the returned packet is a short ACK, the STA3 may consider that the returned packet is certainly not an acknowledgement frame for the STA3 itself.

After correctly receiving a short ACK, the STA3 needs to correctly set return time according to a LENGTH subfield set in the short ACK. In the above Table 1, the reserved status of B0 to B3 is adopted to carry the indication information, so as to indicate whether the acknowledgement frame is a normal ACK or a short ACK. Embodiments of the present invention are not limited thereto, and a reserved status at another position may also be adopted to carry the indication information. Therefore, in the embodiment of the present invention, the short acknowledgement frame may not include a data unit, so that a size of the acknowledgement frame is reduced and an overhead of the acknowledgement frame is cut down, thereby improving interaction efficiency of the acknowledgement frame.

Embodiment 2

A difference between Embodiment 2 and Embodiment 1 is that an explicit bit is used in the control signaling to indicate that the frame is a short ACK.

For example, Table 2 is an exemplary format of control signaling in this embodiment, where a reserved bit B25 carries the indication information, so as to indicate whether the acknowledgement frame is a normal ACK or a short ACK.

TABLE 2

Control signaling

| Bit | Meaning |
| --- | --- |
| B0-B3 | MCS |
| B4-B15 | LENGTH |
| B16-B24 | PAID |
| B25 | SACK (Short ACK), indicating whether the acknowledgement frame is a short ACK |
| B26-B33 | Other fields |
| B34-B41 | CRC |
| B42-B47 | Tail |

In this situation, for the ACK sending end, values of other fields in the short ACK may not be constrained. For the ACK receiving end, as long as it is found that B25 of the control signaling of the returned packet is 1, it is considered that the frame is a short ACK, that is, this acknowledgement frame does not have a data portion. The ACK receiving end may still set the Duration through the LENGTH, or may combine the LENGTH and the MCS to set the Duration.

In the above Table 2, the reserved bit B25 is adopted to carry the indication information, so as to indicate whether the acknowledgement frame is a normal ACK or a short ACK. Embodiments of the present invention are not limited thereto, and a reserved bit at another position may also be adopted to carry the indication information.

Therefore, in the embodiment of the present invention, the short acknowledgement frame may not include a data unit, so that a size of the acknowledgement frame is reduced and an overhead of the acknowledgement frame is cut down, thereby improving interaction efficiency of the acknowledgement frame.

Embodiment 3

A difference between Embodiment 3 and Embodiment 1 is that an bit is redefined with a explicit new definition in the control signaling to indicate that the frame is a short ACK. At this time, a design may be adopted that definitions of each field in control signaling of a normal data frame are completely different from those of each field of the short acknowledgement frame, that is, to redesign a special control signaling field for the short acknowledgement frame.

For example, Table 3 is an exemplary format of control signaling in this embodiment.

TABLE 3

Control signaling

| Bit | Meaning |
| --- | --- |
| B0 | Identifier for the short acknowledgement frame:<br>0: normal data frame<br>1: short acknowledgement frame |
| B1(B0 = 1) | Type of the short acknowledgement frame:<br>0: short ACK<br>1: short CTS |
| B2-B11(B0 = 1) | LENGTH (Duration) |
| B12-B33(B0 = 1) | Partial RA (partial RA) |
| B34-B41(B0 = 1) | CRC |
| B42-B47(B0 = 1) | Tail |

Table 3 shows when the indication information B0=1, definitions of each field in the control signaling of the short acknowledgement frame. If B0=0, another set of completely different definitions may be adopted with reference to Table 1.

For the ACK receiving end, as long as it is found that B0 in the control signaling of the returned packet is 1, it is considered that the frame is a short ACK, that is, this acknowledgement frame does not have a data portion. The ACK receiving end may still set the Duration through the LENGTH.

In the above Table 3, the B0 bit to which a new definition is added is adopted to carry the indication information, so as to indicate whether the frame is a normal data frame or is a short acknowledgement frame. Embodiments of the present invention are not limited thereto, and a reserved bit at another position may also be adopted to carry the indication information. The bit to which a new definition is added may be more than one, so as to indicate more frame types.

Therefore, in the embodiment of the present invention, the short acknowledgement frame may not include a data unit, so that a size of the acknowledgement frame is reduced and an overhead of the acknowledgement frame is cut down, thereby improving interaction efficiency of the acknowledgement frame.

Embodiment 4

A difference between Embodiment 4 and Embodiment 1 is that the short ACK is defined as a new acknowledgement policy. That is, a new acknowledgement policy (a policy 5 as follows) is added:

Policy 1: normal acknowledgement or implicit block acknowledgement;

Policy 2: non-acknowledgement;

Policy 3: non-explicit acknowledgement or scheduled acknowledgement under PSMP;

Policy 4: block acknowledgement; and

Policy 5: truncated normal acknowledgement.

For the data sending end, if the data receiving end is requested to return a short ACK, the data sending end needs to fill the policy 5 into an acknowledgement policy field in a QoS control field. It should be noted that the current policy field only has two bits and can only represent four statuses. If five statuses need to be represented, the field needs to be increased to three bits. After the data receiving end receives the data, if the data receiving end finds that the acknowledgement policy is the policy 5, the data receiving end can only return a short ACK. Therefore, a difference between Embodiment 4 and Embodiment 1 is that the power of deciding whether to use the short ACK belongs to the data sending end.

Because the policy 5 is a redefined acknowledgement policy, the return interval of the short ACK may be redefined. For example, the original SIFS may be cut shorter, so as to further improve the efficiency of the short ACK. Currently, a quadruple relationship exists between the SIFS and OFDM symbol time. For a system bandwidth of 20 MHz, the current ODFM symbol is 4 µs and the SIFS is 16 µs. For a system below 1 GHz, bandwidth may decrease. For a system bandwidth of 2 MHz, the OFDM symbol is 40 µs, and at this time, the SIFS according to a current computation method is 160 µs. At this time, the SIFS may be reduced to twice the OFDM symbol time (80 µs) or one OFDM symbol time (40 µs), or even shorter.

Therefore, in the embodiment of the present invention, the short acknowledgement frame may not include a data unit, so that a size of the acknowledgement frame is reduced and an overhead of the acknowledgement frame is cut down, thereby improving interaction efficiency of the acknowledgement frame.

Embodiment 5

A difference between Embodiment 5 and Embodiment 1 is that the short ACK completely replaces the normal ACK. For example, the policy 1a, which is similar but different to the policy 1:

policy 1a: truncated normal acknowledgement or implicit block acknowledgement.

When the data receiving end finds that the acknowledgement policy field of the data frame is the policy 1, if an acknowledgement frame needs to be sent, a short ACK is sent.

As another embodiment, the short ACK may be used to replace the normal ACK in some scenarios. For example, specific contents of the policy 1a may be distinguished according to different version protocols (for example, the version protocol for a carrier frequency higher than 1 GHz and the version protocol for a carrier frequency lower than 1 GH).

Policy 1b: The version protocol for above 1 GHz represents the normal acknowledgement or the implicit block acknowledgement; and the version protocol for below 1 GHz represents the truncated normal acknowledgement or the implicit block acknowledgement.

At this time, the return interval of the short ACK may be redefined, for example, the current SIFS may be cut shorter, so as to further improve the efficiency of the short ACK. Currently, a quadruple relationship exists between the current SIFS and OFDM symbol time. For a system bandwidth of 20 MHz, the current ODFM symbol time is 4 µs and the SIFS is 16 µs. For a system below 1 GHz, bandwidth may decrease. For a system bandwidth of 2 MHz, the OFDM symbol is 40 µs, and at this time, the SIFS according to a current computation method is 160 µs. At this time, the SIFS may be reduced to twice the OFDM symbol time (80 µs) or one OFDM symbol time (40 µs), or even shorter.

Therefore, in the embodiment of the present invention, the short acknowledgement frame may not include a data unit, so that a size of the acknowledgement frame is reduced and an overhead of the acknowledgement frame is cut down, thereby improving interaction efficiency of the acknowledgement frame.

In addition, the above embodiments of the ACK frame may also be applicable to acknowledgement frames of other types. For example, a CTS frame is an acknowledgement frame specially used for an RTS frame, and an MAC layer frame structure of the CTS frame is completely the same as that of the ACK frame. Therefore, the truncation method of the ACK frame may be adopted to truncate the CTS frame similarly, which is not described here again to avoid repetition.

In addition, different from the ACK frame, the CTS frame does not have as many policies as the ACK and is generally an immediate acknowledgement. Therefore, a newly introduced short CTS may coexist with a normal CTS, or may completely replace the normal CTS, or may replace the normal CTS in some scenarios.

Figure 3:
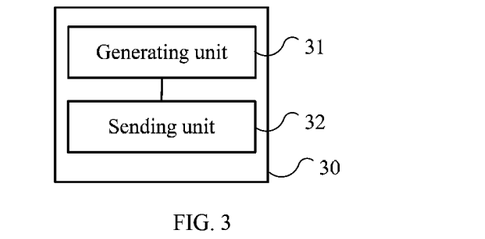
FIG. 3 is a block diagram of an apparatus for transmitting an acknowledgement frame in an embodiment of the present invention.

FIG. 3 is a block diagram of an apparatus for transmitting an acknowledgement frame in an embodiment of the present invention. The apparatus 30 in FIG. 3 is a sending end of an acknowledgement frame, for example, an STA or an AP, which includes a generating unit 31 and a sending unit 32.

The generating unit 31 generates an acknowledgement frame for a send frame. The acknowledgement frame includes a short acknowledgement frame, and the short acknowledgement frame includes an STF, an LTF, and a SIG. The sending unit 32 sends the acknowledgement frame generated by the generating unit 31.

In the embodiment of the present invention, the short acknowledgement frame may not include a data unit, so that a size of the acknowledgement frame is reduced and an overhead of the acknowledgement frame is cut down, thereby improving interaction efficiency of the acknowledgement frame.

The apparatus in FIG. 3 may execute the method in FIG. 1, which is not described in detail again to avoid repetition.

Optionally, as an embodiment, a SIG of the acknowledgement frame generated by the generating unit 31 may include indication information. The indication information is used for indicating whether the acknowledgement frame includes the short acknowledgement frame.

Optionally, as an embodiment, the SIG of the short acknowledgement frame generated by the generating unit 31 may include indication information used for indicating an RA or a partial RA of a receiving party. For example, the RA or the partial RA may be indicated through a PAID field in the SIG. Alternatively, the SIG of the short acknowledgement frame generated by the generating unit 31 may include indication information used for indicating duration of the send frame or a duration of a TXOP. For example, the duration of the send frame or the duration of the transmit opportunity may be indicated through a LENGTH field in the SIG.

Optionally, as another embodiment, the acknowledgement frame generated by the generating unit 31 may also include a normal acknowledgement frame. The normal acknowledgement frame includes an STF, an LTF, a SIG, and a PSDU.

Optionally, as another embodiment, the generating unit 31 may use a reserved bit or a reserved status or a bit to which a new definition is added in the SIG to carry the indication information.

Optionally, as another embodiment, the generating unit 31 may generate the acknowledgement frame according to an indication (for example, a policy 1, 1a, 1b and/or a newly added policy 5 in the above Embodiments 1 to 5) of an acknowledgement policy field. Specifically, for example, when the acknowledgement policy field indicates normal acknowledgement or implicit block acknowledgement or truncated normal acknowledgement, the generating unit 31 may generate a normal acknowledgement frame or the short acknowledgement frame according to a modulation and coding scheme of the PSDU or the SIG. Alternatively, the generating unit 31 may generate a normal acknowledgement frame when the acknowledgement policy field indicate normal acknowledgement or implicit block acknowledgement. Alternatively, the generating unit 31 may generate a short acknowledgement frame when the acknowledgement policy field indicates truncated normal acknowledgement or when the acknowledgement policy field indicates truncated normal acknowledgement or implicit block acknowledgement.

Optionally, as another embodiment, when a version protocol corresponds to a carrier frequency higher than 1 GHz, the generating unit 31 determines that the acknowledgement policy field indicates the normal acknowledgement or the implicit block acknowledgement. When the version protocol corresponds to a carrier frequency lower than 1 GHz, the generating unit 31 determines that the acknowledgement policy field indicates the truncated normal acknowledgement or the implicit block acknowledgement.

Optionally, as another embodiment, the short acknowledgement frame and/or the normal acknowledgement frame may adopt a return interval shorter than an SIFS defined in a current 802.11ac.

Optionally, as another embodiment, definitions of each field in the SIG of the short acknowledgement frame may be the same as or different from those of a normal data frame.

Optionally, as another embodiment, the send frame is a data frame, and the acknowledgement frame is an ACK frame for the data frame. Alternatively, the send frame is an RTS frame, and the acknowledgement frame is a CTS frame for the RTS frame.

Figure 4:
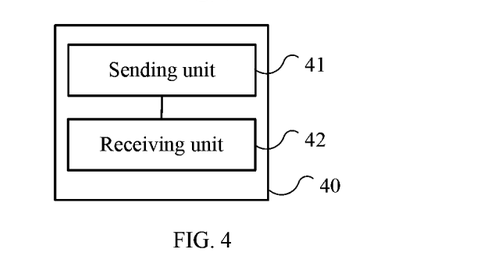
FIG. 4 is a block diagram of an apparatus for transmitting an acknowledgement frame in another embodiment of the present invention.

FIG. 4 is a block diagram of an apparatus for transmitting an acknowledgement frame in another embodiment of the present invention. The apparatus 40 in FIG. 4 is a receiving end of an acknowledgement frame, for example, an STA or an AP, which includes a sending unit 41 and a receiving unit 42.

The sending unit 41 sends a send frame to a receiving end. The receiving unit 42 receives, from the receiving end, an acknowledgement frame for the send frame. The acknowledgement frame includes a short acknowledgement frame, and the short acknowledgement frame includes an STF, an LTF, and a SIG. In the embodiment of the present invention, the short acknowledgement frame may not include a data unit, so that a size of the acknowledgement frame is reduced and an overhead of the acknowledgement frame is cut down, thereby improving interaction efficiency of the acknowledgement frame.

The apparatus 40 in FIG. 4 may execute the method in FIG. 2, which is not described in detail again to avoid repetition.

Optionally, as an embodiment, the receiving unit 42 may obtain indication information included in a SIG of the acknowledgement frame, where the indication information is used for indicating whether the acknowledgement frame includes the short acknowledgement frame.

Optionally, as an embodiment, the receiving unit 42 may obtain an RA or a partial RA of a receiving party included in the SIG of the short acknowledgement frame, or obtain a duration of the send frame or a duration of a TXOP included in the SIG of the short acknowledgement frame.

Optionally, as another embodiment, the acknowledgement frame received by the receiving unit 42 may also include a normal acknowledgement frame. The normal acknowledgement frame includes an STF, an LTF, a SIG, and a PSDU.

Optionally, as another embodiment, the send frame sent by a sending unit 41 may carry an indication of an acknowledgement policy field (for example, a policy 1 and/or a newly added policy 5 in the above Embodiments 1 to 5). Specifically, for example, the acknowledgement policy field may indicate normal acknowledgement or implicit block acknowledgement or truncated normal acknowledgement. Alternatively, the acknowledgement policy field may indicate normal acknowledgement or implicit block acknowledgement. Alternatively, the acknowledgement policy field may indicate truncated normal acknowledgement. Alternatively, the acknowledgement policy field may indicate truncated normal acknowledgement or implicit block acknowledgement.

Optionally, as another embodiment, when a version protocol corresponds to a carrier frequency higher than 1 GHz, the acknowledgement policy field may indicate the normal acknowledgement or the implicit block acknowledgement. When the version protocol corresponds to a carrier frequency lower than 1 GHz, the acknowledgement policy field may indicate the truncated normal acknowledgement or the implicit block acknowledgement.

Optionally, as another embodiment, the receiving unit 42 may obtain indication information carried by a reserved bit or a reserved status or a bit to which a new definition is added in the SIG.

Optionally, as another embodiment, the receiving unit may obtain a PAID included in the SIG, and in a situation in which the PAID is correct, whether the acknowledgement frame is a short acknowledgement frame is determined according to the indication information.

Optionally, as another embodiment, the send frame is a data frame, and the acknowledgement frame is an ACK frame for the data frame. Alternatively, the send frame is an RTS frame, and the acknowledgement frame is a CTS frame for the RTS frame.

A communication system according to an embodiment of the present invention may include the apparatus 30 or 40.

Persons of ordinary skill in the art may be aware that, in combination with the examples described in the embodiments disclosed in this specification, units and algorithm steps may be implemented by electronic hardware, or a combination of computer software and electronic hardware. Whether the functions are executed by hardware or software depends on particular applications and design constraint conditions of the technical solutions. Persons skilled in the art may use different methods to implement the described functions for each particular application, but it should not be considered that the implementation goes beyond the scope of the present invention.

It may be clearly understood by persons skilled in the art that, for the purpose of convenient and brief description, for a detailed working process of the foregoing system, apparatus, and unit, reference may be made to a corresponding process in the method embodiments, and details are not described here again.

In the embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. A part or all of the units may be selected according to the actual needs to achieve the objectives of the solutions of the embodiments.

In addition, each functional unit in the embodiments of the present invention may be integrated into a processing unit, or each of the units may exist alone physically, or two or more units are integrated into a unit.

When the functions are implemented in the form of a software functional unit and sold or used as a separate product, the functions may be stored in a computer-readable storage medium. Based on such an understanding, the technical solutions of the present invention essentially, or the part contributing to the prior art, or part of the technical solutions may be implemented in the form of a software product. The computer software product is stored in a storage medium, and includes several instructions for instructing a computer device (which may be a personal computer, a server, a network device, and the like) to execute all or part of the steps of the method described in the embodiment of the present invention. The storage medium includes: any medium that can store program code, such as a USB flash disk, a removable hard disk, a read-only memory (ROM, Read-Only Memory), a random access memory (RAM, Random Access Memory), a magnetic disk, or an optical disk.

The foregoing descriptions are merely specific embodiments of the present invention, but are not intended to limit the protection scope of the present invention. Any variation or replacement readily figured out by persons skilled in the art within the technical scope disclosed in the present invention shall all fall within the protection scope of the present invention. Therefore, the protection scope of the present invention shall be subject to the protection scope of the appended claims.

What is claimed is:

1. A method applied in a wireless local area network, comprising:
   receiving, by a data receiving end, a send frame from a data sending end;
   generating, by the data receiving end, a short acknowledgement frame for the send frame, the short acknowledgement frame consists of a short training field (STF), a long training field (LTF) and control signaling (SIG) comprising information indicating a duration of a transmit opportunity; and
   sending, by the data receiving end, the short acknowledgement frame to the data sending end;
   wherein a length field in the SIG indicates the duration of the transmit opportunity.

2. The method according to claim 1, wherein the SIG comprises information indicating the short acknowledgement frame.

3. The method according to claim 2, wherein the information indicating the short acknowledgement frame is carried by a bit to which a new definition is added, a reserved bit, or, a reserved status in the SIG.

4. The method according to claim 1, wherein the generating the short acknowledgement frame for the send frame comprises:
   generating the short acknowledgement frame according to an indication of an acknowledgement policy field.

5. A method applied in a wireless local area network, comprising:
   sending, by a data sending end, a send frame to a receiving end; and
   receiving, by a data sending end, from the receiving end, a short acknowledgement frame for the send frame, the short acknowledgement frame consists of a short training field (STF), a long training field (LTF) and control signaling (SIG) comprising information indicating a duration of a transmit opportunity;
   wherein a length field in the SIG indicates the duration of the transmit opportunity.

6. The method according to claim 5, wherein the SIG comprises information indicating the short acknowledgement frame.

7. The method according to claim 6, wherein the obtaining the indication information comprised in the SIG comprises:
   obtaining the indication information carried by a bit to which a new definition is added, a reserved bit, or a reserved status in the SIG.

8. The method according to claim 5, wherein the send frame comprises an acknowledgement policy field.

9. An apparatus, comprising:
   a generating unit, configured to generate a short acknowledgement frame for a send frame received from a data sending end, the short acknowledgement frame consists of a short training field (STF), a long training field (LTF) and control signaling (SIG) comprising information indicating a duration of a transmit opportunity; and
   a sending unit, configured to send the short acknowledgement frame generated by the generating unit to the data sending end;
   wherein a length field in the SIG indicates the duration of the transmit opportunity.

10. The apparatus according to claim 9, wherein the SIG comprises indicating the short acknowledgement frame.

11. The apparatus according to claim 10, wherein
   the generating unit is configured to carry the information indicating the short acknowledgement frame through a reserved bit, a reserved status or a bit to which a new definition is added in the SIG.

12. The apparatus according to claim 9, wherein the generating unit is configured to generate the short acknowledgement frame according to an indication of an acknowledgement policy field.

13. An apparatus, comprising:
   a sending unit, configured to send a send frame to a receiving end; and
   a receiving unit, configured to receive, from the receiving end, a short acknowledgement frame for the send frame, and the short acknowledgement frame consists of a short training field (STF), a long training field (LTF) and control signaling (SIG) comprising information indicating a duration of a transmit opportunity;
   wherein a length field in the SIG indicates the duration of the transmit opportunity.

14. The apparatus according to claim 13, wherein the SIG comprises information indicating the short acknowledgement frame.

15. The apparatus according to claim 13, wherein
   the receiving unit is configured to obtain the indication information carried by a bit to which a new definition is added, a reserved bit, or a reserved status in the SIG.

16. The apparatus according to claim 13, wherein the sending unit is configured to send the send frame comprising an acknowledgement policy field.

* * * * *